Jan. 8, 1946.  A. J. LAUBY  2,392,677
COLLAPSIBLE ARTIFICIAL BAIT
Filed May 15, 1944
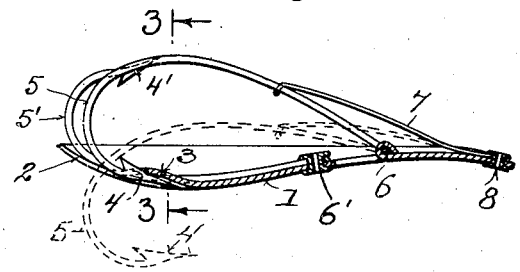
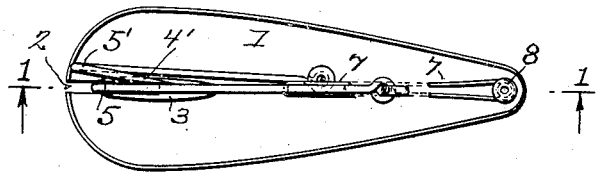
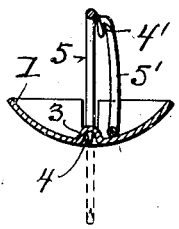
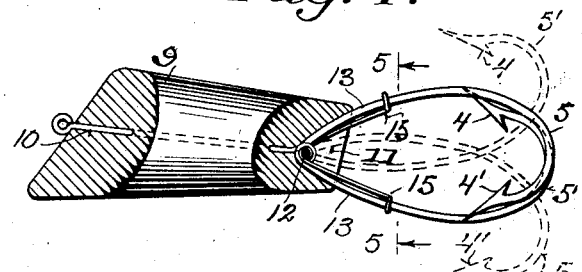
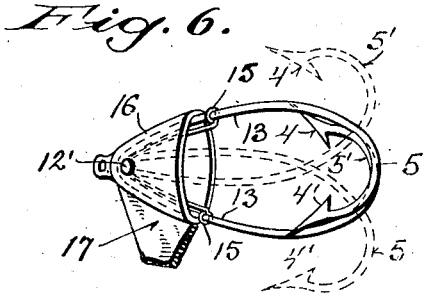
INVENTOR
Anton J. Lauby
BY
ATTORNEYS Patented Jan. 8, 1946

2,392,677

UNITED STATES PATENT OFFICE 2,392,677

COLLAPSIBLE ARTIFICIAL BAIT

Anton J. Lauby, Milwaukee, Wis.

Application May 15, 1944, Serial No. 535,581

1 Claim. (Cl. 43—39)

My invention has for its object to provide a simple, weedless, economical and effective artificial bait.

The primary object of my invention is to provide a companion pair of oppositely disposed inverted hooks connected at their ends and under spring tension, whereby the inverted barb bites of said hooks are normally aligned with their barbs inturned for protection against weeds and the like. It is understood that when the bait is struck, the hooks under their spring pressure expand outwardly to form double engaging points.

With the above and other objects in view, the invention consists in certain peculiarities of construction and arrangement of parts, as will be hereinafter fully set forth in connection with the accompanying drawing and subsequently claimed.

In the drawing:

Figure 1 represents a sectional, elevational view of an artificial bait embodying the features of my invention, the same being associated with a spoon, the section being indicated by line 1—1 of Figure 2.

Figure 2 is a plan view of the same.

Figure 3 is a cross, sectional view of said hooks and spoon, the section being indicated by line 3—3 of Figure 1.

Figure 4 illustrates my invention associated with a plug, the same being a side, elevational view partly in section to more clearly illustrate structural features.

Figure 5 is a cross, sectional view of the same, the section being indicated by line 5—5 of Figure 4.

Figure 6 is still another form of my invention, wherein the hooks are associated with a base in the form of a flattened thimble.

Referring to the drawing, Figures 1 to 3, 1 indicates a spoon of any desired form having its trailing end provided with a slot 2 terminating with a protecting pocket 3, into which is normally nested the barb 4 of the loop or bite 5 of a standard hook. The shank of the hook is hingedly pivoted at 6 to an eye of the spoon. The forward shank end of the spoon has riveted thereto a spring 7 by means of a hollow grummet 8. This grummet serves as a convenient means of attachment for the leader of a line.

The free end of the spring 7 engages the shank of said hook, whereby it is held under tension in the pocket 3 of the spoon. The shank of a second hook 5' is riveted at 6' or otherwise secured to the inner face of the spoon and has a barb 4' and said hook is inverted with reference to the bite 5 and barb 4, whereby the hooks so aligned, when in their normal position, form a loop and serve to protect the barbed ends of said hooks from engaging weeds or other foreign matter.

In Figure 4 of the drawing I provide a head or plug 9 of any desired form, bored for the reception of a wire strand 10 looped at both ends. The rear loop is nested in a guide slot 11 extending into the trailing end of the plug or head and a pivot pin 12 extending through the rear strand loop has hingedly connected thereto the shanks 13 of inverted companion hooks, wherein their bites and barbs 5—5' and 4—4' are protected similar to the structure previously described.

The shanks 13 of these hooks engage the leg ends 15—15 of a bowed spring, which is intermediately coiled about the pin 12, whereby the hooked bites are held in a protected position.

Figure 6 illustrates another form of my invention, wherein a flattened thimble or head member 16 is provided having a front leader eye and one edge of the head member is provided with a weight 17, whereby the bait is normally held against spinning. In this instance the shanks 13—13 of the hooks extend backward into the head cavity or guide slot and are pivotally connected thereto by the pin 12' and said shanks are also held in their normal weedless position by the ends 15 of the spring which, similar to Figure 4, is also confined by a pin 12'.

From the foregoing description, with reference to the forms shown in Figures 4 to 6, inclusive, it is apparent that the pair of hooks and their bite ends are entirely exposed, but rendered weedless as the barbs of said hooks are protected or concealed by the hook shanks, due to the fact that said shanks, under common bowed spring pressure, engage the ends of the head slot, as shown in Figures 4 and 6.

From the foregoing description, it will be apparent that when a fish strikes the bait indicated in Figure 1, the spring controlled hook will spread outwardly and assume the position indicated in dotted lines with reference to the fixed hook, whereby a double gaff is effected and the spring controlled hook is guided in its movement by means of the slot 2. A strike upon the companion hooks in Figures 4 and 5 will act in a similar manner to that previously described, with the exception that in these last structures both hooks will move outwardly as indicated in dotted lines in Figures 4 and 5.

The form of my invention illustrated in Figure 6 may be particularly advantageous for small hooks for use in trout fishing or the like.

Changes in details may be made without departing from the spirit or the scope of my invention, but what I claim as new is:

An artificial weedless bait, comprising a head, having a backwardly flared narrow slot therein, a pair of inverted hooks fitted within the head slot, a pivot pin for the hooks extending through the base of the head slot, and a bowed spring carried by the pivot pin, having its legs extending beyond the head slot, and engaging the shanks of the hooks whereby said shanks are held in engagement with the ends of the head slots to normally protect the barbs positioned between the hook shanks.

ANTON J. LAUBY.